US011827775B2

(12) United States Patent
Wang et al.

(10) Patent No.: US 11,827,775 B2
(45) Date of Patent: Nov. 28, 2023

(54) ETHYLENE-CYCLIC MONO OLEFIN COPOLYMERIZATIONS

(71) Applicant: NOVA CHEMICALS (INTERNATIONAL) S.A., Fribourg (CH)

(72) Inventors: Qinyan Wang, Calgary (CA); XiaoChuan Wang, Calgary (CA); Peter Zoricak, Calgary (CA); Steven Clemens, Calgary (CA); Brian Molloy, Airdrie (CA)

(73) Assignee: NOVA Chemicals (International) S.A., Fribourg (CH)

( * ) Notice: Subject to any disclaimer, the term of this patent is extended or adjusted under 35 U.S.C. 154(b) by 357 days.

(21) Appl. No.: 17/284,840

(22) PCT Filed: Oct. 11, 2019

(86) PCT No.: PCT/IB2019/058699
§ 371 (c)(1),
(2) Date: Apr. 13, 2021

(87) PCT Pub. No.: WO2020/079552
PCT Pub. Date: Apr. 23, 2020

(65) Prior Publication Data
US 2022/0119628 A1   Apr. 21, 2022

(30) Foreign Application Priority Data

Oct. 16, 2018 (CA) ..................... 3020771

(51) Int. Cl.
| | | |
|---|---|---|
| C08F 232/04 | (2006.01) | |
| C08F 4/6592 | (2006.01) | |
| C08L 23/08 | (2006.01) | |
| C08F 2/06 | (2006.01) | |
| C08F 4/642 | (2006.01) | |
| C08F 4/659 | (2006.01) | |
| C08F 210/02 | (2006.01) | |

(52) U.S. Cl.
CPC ............ *C08L 23/0823* (2013.01); *C08F 2/06* (2013.01); *C08F 4/6428* (2013.01); *C08F 4/65908* (2013.01); *C08F 4/65927* (2013.01); *C08F 210/02* (2013.01); *C08F 232/04* (2013.01); *C08L 2314/06* (2013.01)

(58) Field of Classification Search
CPC ........................... C08F 232/04; C08F 4/65927
See application file for complete search history.

(56) References Cited

U.S. PATENT DOCUMENTS

| | | | |
|---|---|---|---|
| 2011/0040052 A1* | 2/2011 | Bburton .............. | C10M 107/10 |
| | | | 526/196 |
| 2017/0037162 A1* | 2/2017 | Morrison ............ | C08F 4/65912 |
| 2017/0226244 A1 | 8/2017 | Goyal et al. | |
| 2017/0233516 A1* | 8/2017 | Yang ....................... | C08L 23/04 |
| | | | 525/210 |

OTHER PUBLICATIONS

Boggioni Laura et al, "Ethylene-co-norbornene copolymerization in the presence of a chain transfer agent", European Polymer Journal, Pergamon Press Ltd. Oxford, GB, vol. 107, Jul. 25, 2018 (Jul. 25, 2018), p. 54-66.
International Preliminary Report and Written Opinion corresponding to PCT/IB2019/058699, dated Jan. 21, 2020, 17 pages.
Wendt R A et al, "13C NMR Studies of Etheneonorbornene Copolymers Using 13C-Enriched Monomers: Signal Assignments of Copolymers Containing Norbornene Microblocks of up To a Length of Three Norbornene Units", Macromolecular Chemistry and Physics, Wiley-Vch Verlag, Weinheim, DE, vol. 202, No. 18, Dec. 27, 2001 (Dec. 27, 2001), p. 3490-3501.

\* cited by examiner

*Primary Examiner* — Caixia Lu
(74) *Attorney, Agent, or Firm* — Thomas J. Styslinger

(57) ABSTRACT

The copolymerization of ethylene with a cyclic mono olefin (such as norbornene) is conducted in the presence of a catalyst system comprising a bridged hafnocene catalyst and a three part activator. The catalyst system provides excellent activity at high polymerization temperatures. Copolymers produced according to this invention have unique microstructure (with methyl branching being observed) and unique rheology.

8 Claims, 1 Drawing Sheet

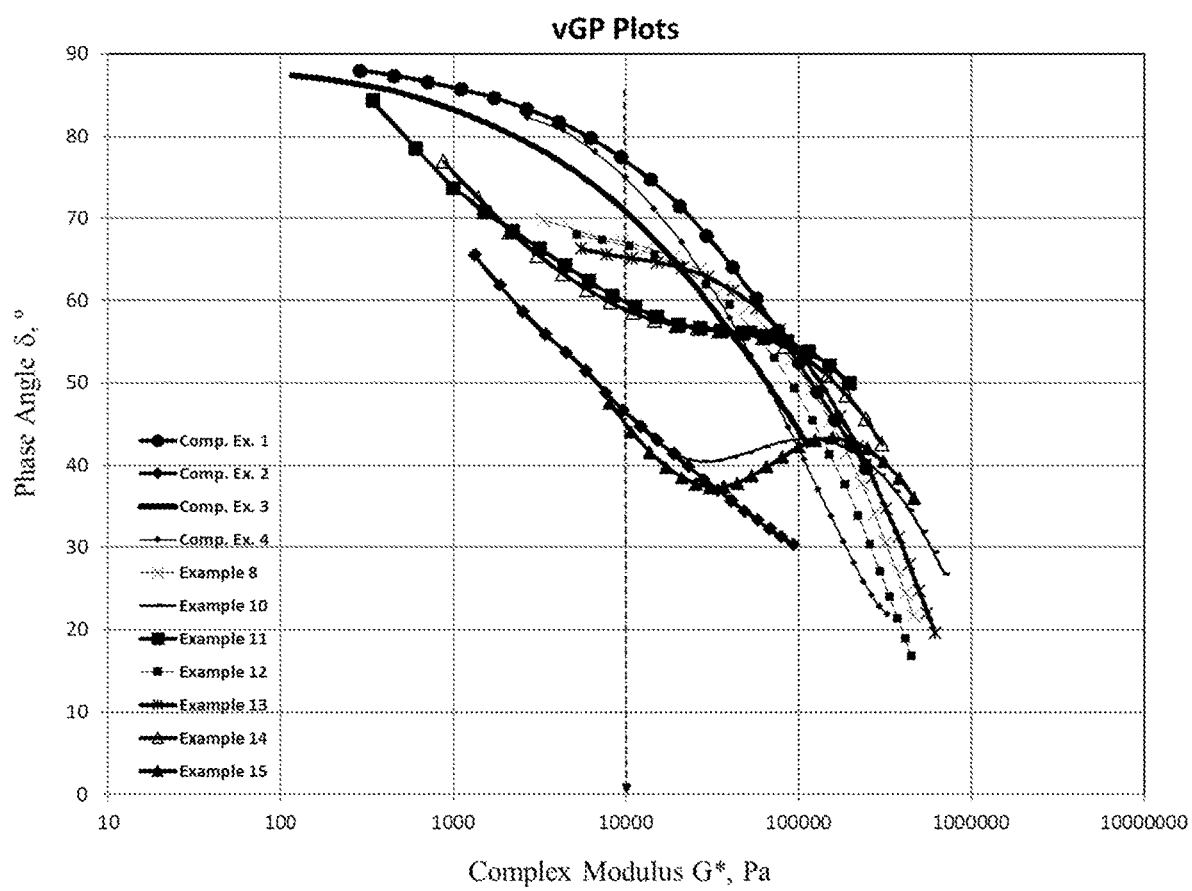

ETHYLENE-CYCLIC MONO OLEFIN COPOLYMERIZATIONS

CROSS-REFERENCE TO RELATED PATENT APPLICATIONS

This application is a U.S. National Phase Application under 35 U.S.C. § 371 of International Application No. PCT/IB2019/058699, filed Oct. 11, 2019, which claims the benefit of priority to CA 3,020,771, filed on Oct. 16, 2018, both of which are incorporated herein by reference in their entirety.

BACKGROUND ART

The copolymerization of ethylene and a cyclic heptene (norbornene) with a vanadium catalyst is described in Canadian Patent 920,742 (Elston). The copolymers are interesting but the productivity of the catalyst is low.

The copolymerization of ethylene and norbornene at temperatures of less than or equal to 140° C. using a bridged hafnocene catalyst and a boron ionic activator is disclosed in WO 2017/138981 (Crowther et al.).

We have now discovered that a three part activator, in combination with a bridged hafnocene catalyst, provides a highly active catalyst system for the copolymerization of ethylene and a cyclic olefin monomer. In addition, it is possible to produce copolymers having a new microstructure with this process.

SUMMARY OF INVENTION

In an embodiment, the present invention provides a process for the copolymerization of ethylene and a cyclic, mono olefin monomer using A) a catalyst defined by the formula:

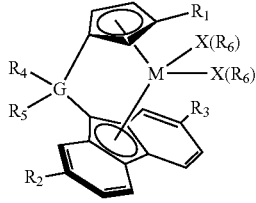

where M is a metal selected from titanium, hafnium and zirconium; G is an element selected from the group consisting of carbon, silicon, germanium, tin or lead; $X(R_6)$ groups are independently selected from a hydrogen atom, a halogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms, and B) a three part activator system comprising B.1) an aluminoxane;
B.2) a boron ionic activator; and
B.3) a hindered phenol.

BRIEF DESCRIPTION OF DRAWING

FIG. 1 provides a plot of the relationship between Phase Angle and Complex Modulus.

DEFINITION OF TERMS

Other than in the examples or where otherwise indicated, all numbers or expressions referring to quantities of ingredients, extrusion conditions, etc., used in the specification and claims are to be understood as modified in all instances by the term 'about'. Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the terms "monomer" "comonomer" refer to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene and optionally one or more additional monomers; regardless of the specific catalyst or specific process used to make the ethylene polymer. In the polyethylene art, the one or more additional monomers are frequently called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant therefrom; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DESCRIPTION OF EMBODIMENTS

In the embodiments disclosed herein, a bridged metallocene catalyst formulation was employed in at least one solution polymerization reactor. This catalyst formulation included a bulky ligand-metal complex, 'Component A', defined by Formula (I):

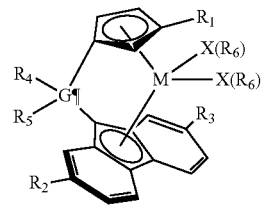

In Formula (I): non-limiting examples of M include Group 4 metals, i.e. titanium, zirconium and hafnium; non-limiting examples of G include Group 14 elements, carbon, silicon, germanium, tin and lead; the $X(R_6)$ groups are independently selected from a hydrogen atom, a $C_{1-20}$ hydrocarbyl radical, a $C_{1-20}$ alkoxy radical or a $C_{6-10}$ aryl oxide radical (these radicals may be linear, branched or cyclic or further substituted with halogen atoms, $C_{1-10}$ alkyl radicals, $C_1$-10 alkoxy radicals, $C_{6-10}$ aryl or aryloxy radicals); $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

In the art, a commonly used term for the $X(R_6)$ group shown in Formula (I) is 'leaving group', i.e. any ligand that can be abstracted from Formula (I) forming a catalyst species capable of polymerizing one or more olefin(s). An equivalent term for the $X(R_6)$ group is an 'activatable ligand'. Further non-limiting examples of the $X(R_6)$ group shown in Formula (I) include weak bases such as amines, phosphines, ethers, carboxylates and dienes. In another embodiment, the two $X(R_6)$ groups may form part of a fused ring or ring system.

Further embodiments of component A include structural, optical or enantiomeric isomers (meso and racemic isomers) and mixtures thereof of the structure shown in Formula (I). While not to be construed as limiting, two species of component A include: a) diphenylmethylene(cyclopentadienyl)(2,7-di-t-butylfuorenyl)hafnium dichloride having the molecular formula $[(2,7\text{-}tBu_2Flu)Ph_2C(Cp)HfCl_2]$, and; b) diphenylmethylene(cyclopentadienyl)(2,7-di-t-butylfuorenyl)hafnium dimethyl having the molecular formula $[(2,7\text{-}tBu_2Flu)Ph_2C(Cp)HfMe_2]$. In an embodiment, each of the phenyl groups of the diphenylmethylene bridge has a para-triethyl silyl substituent.

B. Three Part Activator

B.1 Alum Inoxane (Also Referred to as "Alumoxane")

Although the exact structure of alumoxane co-catalyst is uncertain, subject matter experts generally agree that it was an oligomeric species that contain repeating units of the general Formula (IV):

$$(R)_2AlO\text{---}(Al(R)\text{---}O)_n\text{---}Al(R)_2 \quad (IV)$$

where the R groups may be the same or different linear, branched or cyclic hydrocarbyl radicals containing 1 to 20 carbon atoms and n is from 0 to about 50. A non-limiting example of an alumoxane was methyl alum inoxane (or MMAO-7) wherein each R group in Formula (IV) is a methyl radical.

B.2 Boron Ionic Activator

In general, ionic activators are comprised of a cation and a bulky anion; wherein the latter is substantially non-coordinating.

Non-limiting examples of ionic activators that are four coordinate with four ligands bonded to the boron atom. Non-limiting examples of boron ionic activators included the following Formulas (V) and (VI) shown below;

$$[R^{15}]^+[B(R^{17})_4]^- \quad (V)$$

where B represented a boron atom, $R^{15}$ was an aromatic hydrocarbyl (e.g. triphenyl methyl cation) and each $R^{17}$ was independently selected from phenyl radicals which were unsubstituted or substituted with from 3 to 5 substituents selected from fluorine atoms, $C_{1-4}$ alkyl or alkoxy radicals which were unsubstituted or substituted by fluorine atoms; and a silyl radical of formula $\text{---}Si(R^{19})_3$, where each $R^{19}$ was independently selected from hydrogen atoms and $C_{1-4}$ alkyl radicals, and; compounds of formula (VI);

$$[(R^{18})_tZH]^+[B(R^{17})_4]^- \quad (VI)$$

where B was a boron atom, H was a hydrogen atom, Z was a nitrogen or phosphorus atom, t was 2 or 3 and $R^{18}$ was selected from $C_{1-8}$ alkyl radicals, phenyl radicals which were unsubstituted or substituted by up to three $C_{1-4}$ alkyl radicals, or one $R^{18}$ taken together with the nitrogen atom may form an anilinium radical and $R^{17}$ was as defined above in Formula (VI).

In both Formula (V) and (VI), a non-limiting example of $R^{17}$ was a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators included: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)$_n$-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium) tetrakis (2,3,4,5tetrafluorophenyl)borate. Readily available commercial ionic activators included N,N-dimethylanilinium tetrakispentafluorophenyl borate, and triphenylmethylium tetrakispentafluorophenyl borate.

B.3 Hindered Phenol

As used herein, the term hindered phenol is meant to refer to a phenol or bis phenol molecule having at least two substituents. In an embodiment, each substituent is a $C_1$ to $C_{20}$ hydrocarbyl. Non-limiting example of hindered phenols included butylated phenolic antioxidants, butylated hydroxytoluene, 2,4-di-tertiarybutyl-6-ethyl phenol, 4,4'-methylenebis (2,6-di-tertiary-butylphenol), 1,3, 5-trimethyl-2,4,6-tris (3,5-di-tert-butyl-4-hydroxybenzyl) benzene and octadecyl-3-(3',5'-di-tert-butyl-4'-hydroxyphenyl) propionate. In an embodiment, the mole ratio of the hindered phenol to the molar amount of aluminum in the alumoxane is from 0.1/1 to 0.5/1.

Cyclic Olefin Monomer

The terms cyclic olefin (and cyclic olefin monomer) are meant to convey their standard meaning to those skilled in the art of ethylene copolymerizations. In general, cyclic olefins having from five to twenty carbon atoms, with a cyclic structure that contains from 5 to 8 carbon atoms, are potentially suitable. In an embodiment, the cyclic olefin is a bicyclic olefin, especially one of the bicyclic—[2.2.1]-2 heptenes (which are commonly referred to as norbornenes). 2-norbornene is suitable and widely available.

The amount of cyclic olefin that is contained in the ethylene-cyclic olefins copolymers may be from 0.5 to 60 weight %, especially 3 to 55 weight %.

In an embodiment, the number average molecular weight (Mn) of the copolymers may be from 20,000 to 200,000 and the molecular weight distribution (Mn/Mw) may be from 2.1 to 4.5.

Uses

The ethylene-cyclic olefin copolymers produced according to this invention are suitable for a wide variety of end uses, especially films, sheets and molded goods. Examples of a commercially available ethylene-cyclic olefin copolymers are sold under the trademark TOPAS and it is contemplated that the polymers according to this application will be suitable in similar applications/end uses as those presently served by the TOPAS copolymers.

Process

The copolymers of the present invention may be made by several different polymerization processes. The use of a solution process is especially suitable. A brief outline of solution process technology follows. A suitable solution process has been described in Canadian Patent Application No. CA 2,868,640, filed Oct. 21, 2014 and entitled "Solution Polymerization Process". Embodiments of this solution process includes at least two continuously stirred reactors, R1 and R2 and an optional tubular reactor R3. Feeds (solvent, monomers, catalyst and optional hydrogen) are fed to the two reactors continuously. A catalyst deactivator may be added to the exit stream producing a deactivated solution.

The deactivated solution passes through a pressure let down device, a heat exchanger and a passivator is added forming a passivated solution. The passivated solution passes through a series of vapor liquid separators and ultimately the ethylene interpolymer product enters polymer recover. Non-limiting examples of polymer recovery operations include one or more gear pump, single screw extruder or twin screw extruder that forces the molten ethylene interpolymer product through a pelletizer.

A variety of solvents may be used as the process solvent; non-limiting examples include linear, branched or cyclic $C_5$ to $C_{12}$ alkanes. It is well known to individuals of ordinary experience in the art that reactor feed streams (solvent, monomers, α-olefin, hydrogen, catalyst formulation etc.) should be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene.

Additives

The copolymers according to this invention may contain additives.

Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, and combinations thereof.

Part 1 Chemicals and Common Procedures Handlings

Ethylene was purchased from Praxair as polymer grade. The ethylene was purified and dried by passing the gas through a series of purification beds including alumina, 13X molecular sieves, and a conventional deoxygenation bed.

The 2-norbornene was a waxy solid purchased from TCI America (purity greater than 99.0%).

Xylene was purchased from Univar. It was purified and dried by passing through a deoxygenation catalyst, alumina, and 3A and 13X molecular sieve beds).

Cylcohexane was purchased from Univar. It was purified and dried by passing through a deoxygenation catalyst, alumina beds, and 3A and 13X molecular sieve beds.

13x molecular sieves were purchased from Grace Davison and stored in general lab storage. Before being used as a drying agent, the molecular sieves were heated for 16 hours at 360° C. to activate them and were then pumped into a glovebox at full dynamic vacuum for at least 3 hours. 3A molsieves: Pellets were activated in the same manner.

Triphenylmethylcarbenium tetrakis(pentafluorophenyl) borate (trityl borate) was purchased from Albemarle and used without further purification. Catalyst: Diphenylmethylidene(cyclopentadienyl)(2,7-di-tert-butylfluoren-9-yl)hafnium dichloride) was purchased from Boulder Scientific. It was methylated to diphenylmethylidene(cyclopentadienyl) (2,7-di-tert-butylfluoren-9-yl)hafnium dimethide prior to use.

Modified methylaluminoxane-7 (MMAO-7) was purchased as a 7 wt % solution in ISOPAR® E from Akzo Nobel Polymer Chemicals. It was contained in a pyrosafe cylinder and used as received in a glovebox. 2,6-di-tert-butyl-4-ethylphenol (BHEB) was purchased as a 99% pure compound and used without further purification.

Tri(n-octyl) aluminum: purchased from Chemtura Greenwich with a concentration of 25% in hexane.

2-norbornene Purification 2-norbornene solution: 2-norbornene was dissolved in purified cylcohexane, toluene or xylene to make 2-norbornene solution with desired concentrations (2 mol/L, 4 mol/L and 7.7 mol/L, respectively and used in the Continuous Polymerization Unit (CPU) experiments.

Part 2 Polymer Characterizations

GPC: Molecular weight averages and distribution by Size Exclusion Chromatography (SEC) with an infrared (IR) detector and a viscometer A polymer sample (3 to 8 mg) was weighed into the sample vial and loaded onto the auto-sampler of the Crystallization Elution Fractionation (CEF) unit (purchased from Polymer Char). The vail was filled with 6 to 7 ml 1,2,4-trichlorobenzene (TCB, containing 250 ppm antioxidant 2,6-di-tert-butyl-4-methylphenol (BHT)), heated to the desired dissolution temperature (e.g. 160° C.) with a shaking rate of level number 3 for 2 hours. The solution was then loaded into the CEF sample loop (0.5 ml) and chromatographed on a set of four PL Mixed A GPC columns (purchased from Agilent) sitting inside the top oven of the CEF unit, using 1,2,4-trichlorobenzene (TCB) as the mobile phase with a flow rate of 1.0 mL/minute. The temperature of both main oven and top oven of the CEF instrument was set at 140° C. The SEC eluent was introduced to the Polymer Char infrared detector (IR4) flow cell and then to the differential viscometer (Four-Capillary Bridge Viscometer, Polymer Char). The data were acquired using the CIRRUS® GPC Multi software, and processed using the CIRRUS GPC Multi software and Excel Spreadsheet to provide molecular weight averages and distributions. A polyethylene standard with a narrow molecular distribution, SRM1484a (purchased from National Institute of Standards & Technology), was used to determine the inter-detector delay. A NOVA Chemicals' commercial ethylene-octene copolymer resin, FPs117-C, was used to calibrate the Infrared detector (IR4) and the differential viscometer. There was a slight impact of norbornene content on the IR4 detector response observed as compared with the ethylene-octene copolymer resin, the IR4 detector response was corrected with sample concentration when analyzing the ethylene-norbornene copolymers since these copolymers made with a single site catalyst were expected to have a uniform comonomer (i.e. norbornene) distribution.

NMR: NMR samples were prepared by swelling the polymer in a 10/90 mixture of 1,2-dichlorobenzene-$d_4$/1,2-dichlorobenzene (ODCB-$d_4$/ODCB) in 10 mm NMR tubes at 125° C. $^{13}$C{$^1$H} NMR spectra were collected on a 400 or 700 MHz NMR spectrometer in 10 mm sample tubes at 125° C. An inverse gated decoupling scheme with a 90° pulse and 30 s interpulse delay was used. Spectra were collected until the PE backbone peak reached a signal/noise ratio of 20000:

1; chemical shifts were referenced to the polymer backbone resonance, designated to be 30.0 ppm.

2-norbornene content and sparse aliphatic branching were calculated by comparing the integral of unique peaks or regions from that unit with the total $^{13}$C integral and using the following formula:

$$\frac{units}{1000C} = \frac{\left(\frac{I_{peak}}{n}\right)}{I_{total}} \times 1000$$

units/1000C=(($I_{peak}$/n))$I_{total}$×1000

Where $I_{peak}$ is the integral of the unique peak from the unit; n is the number of equivalent carbons from the unit contributing to the peak; $I_{total}$ is the total integral across all $^{13}$C peaks from the polymer sample. For C1 & C2 branches, the branch peaks are isolated. For 2-norbornene, the regions 46.5-50.1 ppm and 40.7-42.5 ppm were used (n=2 for each region).

DMA (Dynamic Mechanical Analyses)

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity (η*) were obtained as a function of frequency. The phase angle can be calculated from the tested G' and G". The same rheological data can also be obtained by using a 25 mm diameter parallel plate geometry at 190° C. under nitrogen atmosphere.

DSC (Differential Scanning Calorimetry)

Primary melting peak (° C.), heat of fusion (J/g) and crystallinity (%) was determined using differential scanning calorimetry (DSC) as follows: the instrument ((TA Instruments Q2000) was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. ata cooling rate of 10° C./min and kept at 0° C. for five minutes; the specimen was then heated to 200° C. at a heating rate of 10° C./min. The DSC Tm, heat of fusion and crystallinity are reported from the 2$^{nd}$ heating cycle.

Strain Hardening Test

The transient extensional rheology of resins was studied using a host rotational rheometer sold under the name Sentmanat™ Extensional Rheometer ("SER"). Rectangular samples with pre-measured dimensions were mounted between the fixing clamps and were heated up to the measurement temperature. The resulting torques M was then monitored upon stretching of the mounted sample as a function of time at a constant Hencky strain rate ($\dot{\varepsilon}_H$) ranging between 0.01-10 s$^{-1}$. The transient extensional viscosity $\eta_E^+(t)$ was calculated using the following equation:

$$\eta_E^+(t) = \frac{M(t)}{2R\dot{\varepsilon}_H A(T)\exp(-\dot{\varepsilon}_H t)}$$

in which R is the SER drum radius (5.155 mm) and A(T) is the corrected cross-sectional area of the sample as a function of temperature. The cross-sectional area of the sample at the testing temperature was estimated using the equation in below:

$$A(T) = A_0\left(\frac{\rho_s}{\rho_m(T)}\right)^{2/3}$$

in which $A_0$, $\rho_s$ and $\rho_m$ are the measured cross-sectional area in solid-state, the sample solid-state density and the melt-state density at temperature T.

A parameter, Melt Strain Hardening Index (MSHI) or $\eta_E^*/\eta_{Linear}^*$, is calculated as follows using the transient extensional viscosity data tested at 150° C. and 0.3$^{-1}$ Henky strain rate, The data from 1 to 4 seconds are fitted to obtain a linear equation of $\eta_{Linear}^*$ vs time ($\eta_{Linear}^*$=a+b*time). If the slope (b value) is less than 0, the average MSHI below is defined as "<0.98", The data starting from 4 seconds to the end point ($t_f$) where the data is still reliable are selected. Then the Melt Strain Hardening Index (MSHI)=$\eta_E^*/\eta_{Linear}^*$ for each experimental point is calculated, where $\eta_E^*$ is the tested extensional viscosity and $\eta_{Linear}^*$ is the calculated value using the above fitted equation, for each experimental point between 4 to $t_f$ seconds, The average MSHI (time=4 to $t_f$ seconds) is then obtained by averaging the MSHI data from 4 to $t_f$ seconds.

An example of calculating MSHI is illustrated in the following FIG. 1.

Part 3 Polymerization Reactions

All the polymerization experiments were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 75 mL internal volume. In some experiments, the volumetric feed to the reactor was 27.0 mL/min and for some it was 33.0 mL/min which have slight impacts on the hold-up time of the polymerization reactions.

The catalyst solutions were pumped to the reactor independently. The polymerizations were carried out in cyclohexane at a pressure of 1500 psi. Ethylene was supplied to the reactor by a calibrated thermal mass flow meter at the rate shown in Table 1 and Table 2 was dissolved in the reaction solvent prior to the polymerization reactor. Under these conditions the monomer conversion is a dependent variable controlled by the catalyst concentration, reaction temperature and catalyst component ratios, etc.

The internal reactor temperature is monitored by a thermocouple in the polymerization medium and can be controlled at the required set point to +/−0.5° C. Downstream of the reactor the pressure was reduced from the reaction pressure (1500 psi) to atmospheric.

The ethylene conversion was determined by a dedicated on-line gas chromatograph by reference to propane which was used as an internal standard. The average polymerization rate constant was calculated based on the reactor hold-up time, the catalyst concentration in the reactor and the ethylene conversion and is expressed in l/(mmol*min). Polymerization activity Kp is defined as: (Kp)(HUT)=Q((1−Q)(1/catalyst concentration)

Where: Q is the percent ethylene conversion; [M] is the catalyst (metal) concentration in the reactor expressed in mM; and HUT is the reactor hold-up time in minutes.

The following single site catalyst (SSC) components were used: diphenylmethylene(cyclopentadienyl)(2,7-di-t-butyl-fuorenyl)hafnium dimethide [(2,7-tBu$_2$Flu)Ph$_2$C(Cp)HfMe$_2$]; methylaluminoxane (MMAO-07); trityl tetrakis(pentafluoro-phenyl)borate (trityl borate), tri-n-octylaluminum and 2,6-di-tert-butyl-4-ethylphenol (BHEB). The catalyst was activated in situ (in the polymerization reactor) at the reaction temperature in the presence of the monomers.

TABLE 1

Catalyst Activation for Ethylene and Norbornene Copolymerization at 160° C.

| Examples | 1 | 2 | 3 | 4 | 5 | 6 |
|---|---|---|---|---|---|---|
| Activator | B/MMAO/OH | B/Al | B/Al | B/MMAO | B/MMAO | B/MMAO/OH |
| Al:Hf (mol:mol) | 100 | 100 | 100 | 100 | 100 | 100 |
| Polymerization Temperature (° C.) | 160 | 160 | 160 | 160 | 160 | 160 |
| Ethylene (g/min.) | 2.7 | 2.7 | 2.7 | 2.7 | 2.7 | 2.7 |
| 2-Norbornene:Ethylene Ratio (g:g) | 0.2954 | 0.2954 | 0.2954 | 0.2954 | 0.2954 | 0.2954 |
| Cat. Solution Flow (mL/min) | 0.7 | 0.7 | 6.63 | 0.7 | 6.63 | 0.7 |
| Ethylene Conversion (%) | 90.7 | 44.0 | 90.5 | 40.2 | 74.7 | 90.9 |
| Catalyst Concentration in the Reactor (micromol/L) | 2.27 | 2.27 | 17.58 | 2.27 | 18.64 | 2.27 |
| Kp (1/(mM · min)) | 1648 | 134 | 255 | 114 | 79 | 1707 |
| Total Solution Flow (mL/min) | 27.0 | 27.0 | 33.0 | 27.0 | 33.0 | 27.0 |
| Hold Up Time (min) | 2.6 | 2.6 | 2.1 | 2.6 | 2.1 | 2.6 |

In Table 1: MAO stands for methyl aluminoxane;

Al stands for tri-(n-octyl) aluminum;

B = trityl borate;

OH = 2,6-di-tert-butyl-4-ethylphenol (BHEB)

Parameters that keep constant for all the runs are as follows

Metal complex tank concentration = 0.0875 millimoles/liter (mmol/L)

B:Hf = 1.2/1 ((mol/mol)

OH/Al Mole ratio = 0.3/1

Al to metal ratio = 100/1

Polymerization temperature: 160 C.

Ethylene flow = 2.7 g/min

Norbornene to ethylene ratio = 0.2954 g/g

Catalyst concentration in Table 1 is reported in micromoles/liter

TABLE 2

Methyl Branching in the Ethylene and Norbornene Copolymers

| Examples | 7 | 8 | 9 | 10 | 11 | 12 | 13 | 14 | 15 |
|---|---|---|---|---|---|---|---|---|---|
| Polymerization Temperature (° C.) | 160 | 120 | 170 | 160 | 190 | 120 | 120 | 160 | 170 |
| Ethylene (g/min.) | 2.7 | 1.9 | 3.0 | 2.7 | 3.5 | 1.7 | 1.7 | 2.7 | 3.0 |
| Ethylene Conversion (%) | 95 | 92 | 97 | 73.3 | 90.8 | 85.1 | 89.5 | 95.1 | 89.7 |
| Kp (1/(mM · min)) | 2073 | 422 | 3985 | 3672 | 1602 | 212 | 484 | 4191 | 4933 |
| Norbornene Content (wt %) | 24.5 | 43.11 | 21.4 | 4.63 | 1.3 | 47.9 | 41.8 | 13.0 | 0.7 |
| Mw*10$^{-3}$ (PD) | 123.6 (2.4) | 259 (2.3) | 61.2 (2.4) | (N/A) | 90.2 (2.3) | 366 (2.3) | 309 (2.5) | 115 (2.3) | 157 (2.5) |
| C1/1000C | 0.9 | 0.09 | 2.13 | 1.0 | 1.78 | 0 | 0.1 | 1.06 | 1.44 |

In Table 2, the MAO and 2,6-di-tert-butyl-4-ethylphenol (BHEB) were used for all the experiments.

Metal complex tank concentration = 0.1750 mmol/L

B:Hf = 1.2/1 ((mol/mol)

BHEB/MAO molar ratio = 0.3/1;

MAO to metal ratio = 100/1.

Catalyst flows were adjusted to achieve the desired ethylene conversion

TABLE 3

| Material | TOPAS Resin C1 and C6+ Branches | | | |
|---|---|---|---|---|
| | C1/1000C | C2/1000 C | C4/1000C | C6+/1000C |
| TOPAS-8007 | Not detected | Not detected | 0.72 | Not detected |

The results in Tables 2 and 3 show that the polymers of Table 2 contain methyl branching but the TOPAS polymers do not.

Slurry Polymerization

A Bench Scale Reactor (BSR) having a nominal 2 liter volume was operated in the slurry phase using 640-650 mL of n-hexane at 90° C. There was 128 psig of total operating pressure for these experiments. Catalyst delivery and polymer removal were in batch mode, and ethylene feed-stream delivery was continuous and delivered via a mass flow indicating controller.

Pressure control of the reactor was done by the use of a single control loop where input to the loop was in the form of the observed reactor pressure. The loop output controlled the flow of only ethylene to the reactor to maintain the set pressure.

The reactor was equipped with impeller stirrers that spin at 525 rpm to provide reactor mixing.

The reactor was heated to 100-105° C. for 1 hour and thoroughly purged with nitrogen to 300 psig (four times) and once with ethylene. The reactor was then cooled, n-hexane was added to the reactor and a solution of SMAO (comprising BHEB and MMAO-7 in toluene) was then injected into the reactor using a syringe. The polymerization catalyst was diluted in purified toluene was loaded into a catalyst injection tube in an inert atmosphere glove box.

A second injection tube was prepared for the co-catalyst. This was comprised of trityl borate and toluene added in the glove box.

Both of the catalyst injection tubes were attached to the reactor, and 300 psig of nitrogen pressure was applied the injection chambers. Once the reactor was at the temperature set point, ethylene was introduced to the set pressure and static nitrogen pressure was used to inject the co-catalyst, and the catalyst into the reactor to initiate polymerization.

The run was continued for 30 minutes, before the ethylene flow was stopped. Cooling water was turned on and the ethylene was slowly vented from the reactor. The reactor was then purged with nitrogen and the reactor was opened so that the reactor contents, the reactor appearance and the polymer could be observed. The polymer was removed, dried and then weighed.

TABLE 4

| NMR Results on Ethylene Homopolymer Generated Under the Slurry Polymerization Conditions | | | |
|---|---|---|---|
| Example | C1/1000 C | C2/1000 C | C4/1000C |
| Example 16 | Not detected | Not detected | 0.23 |

The results show that polymers produced at the lower temperature of this example do not contain detectable levels of methyl branching whereas the polymers shown in Table 2 (produced at a temperature of 160° C.) do contain methyl branching.

Part 4 Ethylene and Norbornene Copolymer Analysis

Table 5 shows the average melt strain hardening index (MSHI) calculated. LDPE or the high pressure polyethylenes are well known to have relatively large amount of long chain branches and the length of the long chain branches is believed similar to that of the polymer backbone. It can be seen in the Table 5 that the four grades of LDPE exhibit high MSHI values which are higher than 0.98. The MSHI value of the TOPAS 8007F has a value of 0.94 which is lower than 0.98. The MSHI value of the TOPAS 6103F, though tested at 191° C., has a value of 0.91 which is also lower than 0.98. The MSHI values of the new ethylene-norbornene polymers are smaller than 0.98.

TABLE 5

| | Average Melt Strain Hardening Index (Time from 4 to $t_f$ seconds) of the Ethylene and Norbornene Copolymers | | | | |
|---|---|---|---|---|---|
| Polymer | Norbornene content Br/1000C | Norbornene content mol % | Test Temperature of Extensional Viscosity (° C.) | Average Melt Strain Hardening Index (time from 4 to $t_f$ seconds) | Slope (b value) |
| Eastman LDPE 808P | N/A | N/A | 150 | 1.69 | 3092.5 |
| ExxonMobil LD201.48 | N/A | N/A | 150 | 1.65 | 5918 |
| DuPont LDPE 1640 | N/A | N/A | 150 | 1.34 | 6518 |
| NOVA LDPE LC-0522-A | N/A | N/A | 150 | 1.28 | 6501 |
| TOPAS 8007F | | | 150 | 0.94 | 23397 |
| TOPAS 6103F | | | 191 | 0.91 | 75317 |
| Example 10 | 6.96 | 1.39 | 150 | 0.90 | 168966 |
| Example 11 | 1.90 | 0.40 | 150 | 0.92 | 9280 |
| Example 12 | 69.80 | 14.00 | 150 | 0.95 | 326404 |
| Example 13 | 61.10 | 12.20 | 150 | 0.93 | 213471 |
| Example 14 | 19.30 | 3.90 | 150 | 0.97 | 21120 |
| Example 15 | 1.10 | 0.20 | 150 | 0.83 | 105134 |

The vGP plot below shows that at the complex modulus of 10000 Pa, the phase angles of the new ethylene-norbornene polymers are smaller than 70°, while those of TOPAS 8007F and 6103F are higher than 70°. Although the currently tested data of Example 10 (2-3759-04) has not reached the 10000-Pa complex modulus. From the trend showed, it is believed that the phase angle at 10000 Pa for of Example 10 (2-3759-04) will be well below 70° if the testing frequency will be expanded (to the direction of even lower frequency).

INDUSTRIAL APPLICABILITY

A three part activation system improves the productivity of a catalyst for the copolymerization of ethylene with a cyclic olefin. The resulting copolymers are useful for the manufacture of a large variety of goods, especially for packaging applications.

The invention claimed is:

1. A process for the copolymerization of ethylene and a cyclic mono olefin comonomer wherein said process is conducted using a catalyst system containing:
A) a bridged metallocene catalyst defined by the formula:

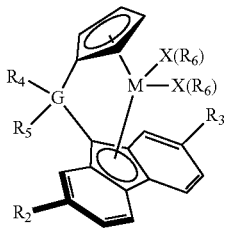

where M is a metal selected from titanium, hafnium and zirconium; G is an element selected from the group consisting of carbon, silicon, germanium, tin and lead; each $X(R_6)$ group is independently selected from a hydrogen atom, a halogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms, and
B) a three part activator system containing:
B.1) an alumoxane;
B.2) a boron ionic activator; and
B.3) a hindered phenol;
wherein said copolymerization is conducted under solution polymerization conditions at a temperature of 160° C. to 230° C.

2. The process of claim 1 wherein the mole ratio of said hindered phenol to the molar amount of aluminum contained in said alumoxane is from 0.1/1 to 0.5/1.

3. The process of claim 1 wherein said cyclic olefin is norbornene.

4. The process of claim 1 wherein said borate is trityl borate.

5. The process of claim 1 wherein said hindered phenol is 2,6 ditertiary butyl-4-ethyle phenol.

6. The process of claim 1 wherein said catalyst is selected from the group consisting of a) diphenylmethylene(cyclopentadienyl)(2,7-di-t-butylfuorenyl)hafnium dichloride having the molecular formula [(2,7-tBu2Flu)Ph2C(Cp)HfCl2], and; b) diphenylmethylene(cyclopentadienyl)(2,7-di-t-butylfuorenyl)hafnium dimethyl having the molecular formula [(2,7-tBu2Flu)Ph2C(Cp)HfMe2].

7. The process of claim 1 wherein
1) said cyclic olefin is norbornene; and
2) said process produces an ethylene-norbornene copolymer characterized by having:
2-1) a norbornene content of from 0.5 to 60 weight %;
2-2) from 0.5 to 3 methyl branches per 1000 carbon atoms;
2-3) a phase angle of less than 70° at a complex modulus of 1000 Pa; and
2-4) a melt strain hardening index, MSHL, of less than 0.98.

8. The process of claim 7 wherein said phase angle is from 25° to 70° at a complex modulus of 10000 Pa and said melt strain hardening index, MSHI, is from 0.30 to 0.98.

* * * * *